United States Patent [19]

Ragan

[11] 4,408,879

[45] Oct. 11, 1983

[54] BEAM PROJECTOR FOR WHEEL ALIGNER

[75] Inventor: Marshall P. Ragan, Mayflower, Ark.

[73] Assignee: FMC Corporation, Chicago, Ill.

[21] Appl. No.: 261,441

[22] Filed: May 8, 1981

[51] Int. Cl.³ .................... G01B 11/26; G02B 23/10
[52] U.S. Cl. .................................. 356/155; 356/252
[58] Field of Search .................... 356/138, 154–155, 356/252; 33/203.18, 228, 288, 298

[56] References Cited

U.S. PATENT DOCUMENTS

| | | | |
|---|---|---|---|
| 2,007,010 | 7/1935 | Thearle | 356/154 |
| 2,407,090 | 5/1949 | Carrigan et al. | 356/155 |
| 3,552,024 | 1/1971 | Hunter | 33/288 |
| 3,689,161 | 9/1972 | Lill et al. | 356/155 |
| 3,796,496 | 3/1974 | Appler et al. | 356/138 |
| 3,953,134 | 4/1976 | Appel et al. | 356/155 |
| 3,994,597 | 11/1976 | Calder et al. | 356/252 |
| 4,097,157 | 6/1978 | Lill | 356/152 |
| 4,130,362 | 12/1978 | Lill et al. | 356/152 |
| 4,150,897 | 4/1979 | Roberts, Jr. et al. | 356/152 |
| 4,154,531 | 5/1979 | Roberts, Jr. et al. | 356/152 |

FOREIGN PATENT DOCUMENTS 955261 4/1964 United Kingdom ............... 356/138

Primary Examiner—William H. Punter
Attorney, Agent, or Firm—H. M. Stanley; R. B. Megley

[57] ABSTRACT

A projector is disclosed which is constructed as an integral part of a wheel alignment head for use in an alignment system for the wheels supporting a vehicle chassis. The projector causes a beam to be emitted from the "back" of the alignment head toward the supporting wheels at the opposite end of the chassis. The projector is configured so that the direction of the projected beam relative to a reference direction may be adjusted within about plus or minus 5° of arc by turning a manually accessible adjustment knob. The adjustment knob also causes a corresponding adjustment to a signal generator so that a signal output is obtained therefrom which is indicative of the angular departure of the beam from the referenced direction.

4 Claims, 5 Drawing Figures

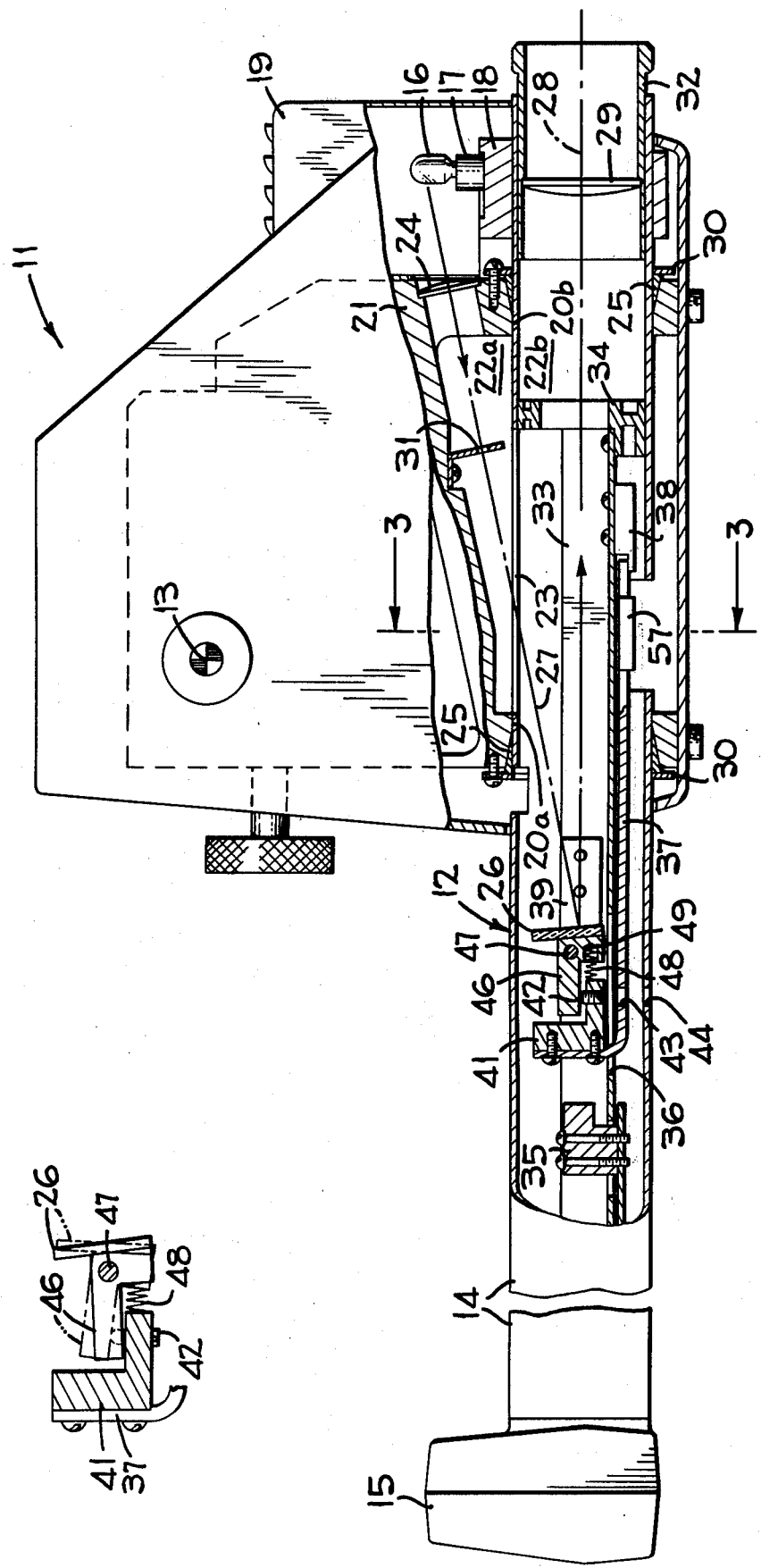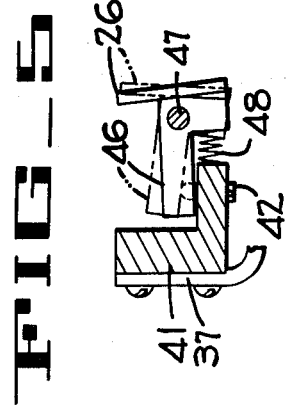

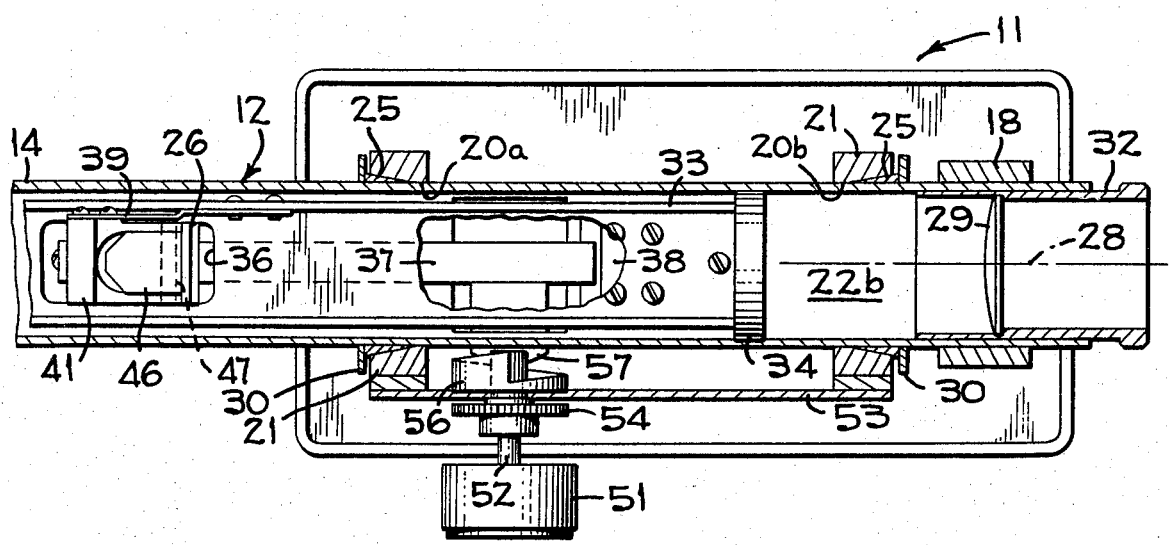
FIG_2
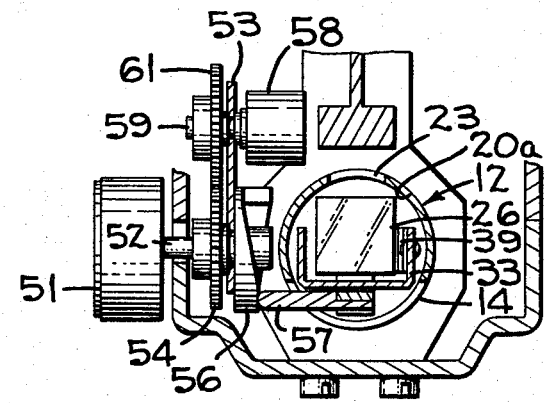
FIG_3
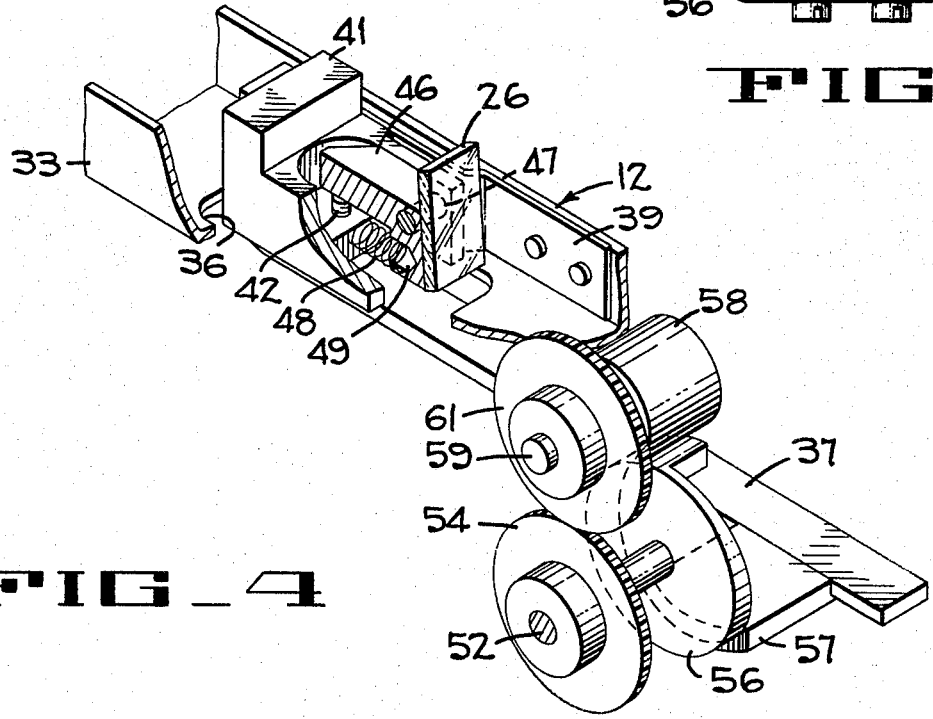
FIG_4

BEAM PROJECTOR FOR WHEEL ALIGNER

BACKGROUND OF THE INVENTION

1. Field of the Invention

This invention relates to vehicle wheel alignment equipment, and more particularly, to a light beam projector for use in such equipment when obtaining orientation data for the wheels in a toe plane.

2. Description of the Prior Art

An aimable view finder for use in a wheel alignment system is disclosed in patent application U.S. Ser. No. 261,445, entitled INDIVIDUAL TOE MEASURING SYSTEM, filed of even date herewith. The disclosed view finder relates to an optical assembly wherein an objective lens is positioned at one end of a viewing path formed in a framework. A pair of plano prisms are mounted for rotation about the axis of the viewing path in a position on the image side of the objective lens so that light passed by the lens is intercepted and deflected in substantially equal and opposite vertical directions by the pair of plano prisms. Additional optics are provided through which the light emitted by the objective lens and skewed laterally by the plano prism pair may be viewed. A signal generator is coupled to the plano prisms so that a signal is provided which is indicative of the amount of lateral deflection imposed by the prisms on the light passed through the objective lens. An index line is provided in the optics to indicate on the observed image the direction in which the viewing path is aimed.

Apparatus providing rearward projecting light beams for use in determining the inclinations of front steerable wheels relative to the axis of rotation of one of the rear nonsteerable wheels are found in U.S. Pat. Nos. 4,154,531, Roberts, Jr. et al, issued May 15, 1979; 4,150,897, Roberts, Jr. et al, issued Apr. 24, 1979; 4,130,362, Lill et al, issued Dec. 19, 1978; and 4,097,157, Lill, issued June 27, 1978, all of which are currently assigned to the assignee of record of the invention disclosed herein.

The U.S. Pat. No. 4,154,531 patent discloses apparatus wherein the rearward projected beam is caused to swing through a predetermined angle. The beam is reflected by a mirror mounted in predetermined relationship with the axis of rotation of one of the rear nonsteerable wheels so that the oscillating beam is reflected back to a target mounted on the front steerable wheel on the same side of the vehicle. The time relationship between the instants when the projected oscillating beam is received by light sensitive devices when reflected toward the front wheel mounted target is used to determine the inclination of the front steerable wheel in the horizontal or toe plane.

A rotating prism is disclosed in the U.S. Pat. No. 4,150,897 specification which provides for linear displacement of the point of impingement of a beam on the surface of a lens to thereby cause the beam to transit through a sweep angle as it emerges from the projection side of the lens.

The U.S. Pat. No. 4,130,362 patent discloses a multiplicity of beams projected at known angles relative to a reference angle from a projector mounted on one of the steerable front wheels of the vehicle. A mirror mounted on the rear wheel on the same side of the vehicle in predetermined relationship with the axis of rotation of the rear wheel reflects one of the projected beams back to the front wheel assembly. The reflected and received beam from the multiplicity of beams determines the inclination of the front wheel in the horizontal or toe plane.

The U.S. Pat. No. 4,097,157 patent disclosure makes reference to a rearwardly projected beam which is reflected by a mirror mounted in predetermined relationship with a nonsteerable wheel on the same side of the vehicle. The reflected beam is received at an encoding target which is mounted on the front wheel on the same side of the vehicle to provide an indication of the inclination of the front wheel in a horizontal or toe plane relative to the axis of rotation of the rear wheel.

SUMMARY OF THE INVENTION

According to the present invention an aimable projector is provided which is adapted to be installed in an alignment head for use in an alignment system for wheels supporting a vehicle chassis. A framework is attached to the alignment head and a passage is formed through the framework which has a passage reference axis therealong. A light source is disposed at one end of the passage which provides a light beam through the passage. A first lens is disposed adjacent to the light source operating to focus an image of the light source at the other end of the passage. A reticle is mounted in the passage and a second lens is mounted at the other end of the passage operating to focus an image of the reticle at a predetermined distance from the alignment head. Means for adjusting the angular position of the light beam and the displacement of the reticle image relative to the passage reference axis is mounted in the passage.

BRIEF DESCRIPTION OF THE DRAWINGS

FIG. 1 is a side elevation, with portions being broken away, of the apparatus of the present invention.

FIG. 2 is a fragmentary plan view of the apparatus of the present invention, with portions being broken away.

FIG. 3 is a transverse section taken along the line 3—3 of FIG. 1.

FIG. 4 is a cutaway perspective view of the adjustment portion of the present invention.

FIG. 5 is a detailed view, partially in section, of another adjustable portion of the present invention.

DESCRIPTION OF THE PREFERRED EMBODIMENT

A wheel mounting alignment head 11 is shown in FIG. 1 which is similar to the heads disclosed in U.S. Pat. Nos. 4,097,157 or 4,150,897 mentioned hereinbefore. The alignment head is adapted to be mounted on the supporting wheels for a vehicle chassis but is modified as compared to those disclosed in the aforementioned U.S. patents. The head to be described herein is useful in the apparatus and method disclosed in the application entitled INDIVIDUAL TOE MEASURING SYSTEM U.S. Ser. No. 261,445 filed of even date herewith.

An aimable light beam projector depicted generally at 12 is shown in the sectioned portion of the alignment head 11 of FIG. 1. The alignment head 11 is adapted to be attached to a vehicle wheel by means of a wheel clamp so that an axis 13 is generally aligned with the spin axis of the wheel as is known from the prior art. A boom tube 14 (shown shortened in FIG. 1) extends from the alignment head and carries at the end thereof a projector lens and detector 15 utilized in alignment measurements.

A high intensity halogen lamp 16 is placed in a receptacle 17 mounted on a lamp base and counterweight 18. A vented cover 19 surrounds the lamp.

A framework 21 is provided for the alignment head. A pair of aligned bores 20a and 20b are formed in the framework 21 having a beveled section in each bore. A beveled ring 25 is formed to surround the outer diameter of the boom tube 14 and to fit into the beveled portion of the bores. An annular washer-like ring 30 is brought to bear against the base of the beveled rings by means of screws as shown so that the beveled ring is forced into the beveled portion of the bores thereby firmly fixing the boom tube 14 in position relative to the framework 21. A passage having angularly disposed lengths 22a and 22b is shown wherein the length 22a passes through a portion of the framework and an opening 23 in the side of the boom tube 14 to the interior of the tube. The portion 22b of the passage extends internally of the boom tube toward the "back" side of the alignment head 11.

A condensing lens 24 is positioned in the end of the passage portion 22a which is adjacent to the halogen lamp 16. A reflector 26 is situated at the junction of the passage lengths 22a and 22b and is oriented so that a primary beam 27 from the halogen lamp passing through the condensing lens 24 impinges on the reflector. The reflector is oriented by means to be hereinafter described so that the primary beam is reflected along the second passage length 22b. A reference axis 28 extends from the "back" side of the alignment head 11 in a direction which is parallel to the plane of a wheel upon which the alignment head is mounted.

The properties of the condensing lens 24 and the spacing between the halogen lamp 16 and the condensing lens is such that an image of the lamp filament is formed at approximately the position of a projection lens 29 at the other end of the angled passage 22a/22b from the end in which the condensing lens is mounted. A reticle window 31 is mounted in the passage 22a at a position near the focal length of the projection lens 29 so that an image of the reticle may be projected to focus in a plane at a considerable distance from the "back" side of the alignment head 11. It may therefore be seen that the lamp 16 projects a beam of light which is focused by the condensing lens 24 at approximately the surface of the projection lens 29 to assure an adequate light intensity projection. The projection lens 29 also focuses an image of the reticle window 31 at a distance from the alignment head 11 in accordance with the displacement distance of the recticle window from the projection lens and the characteristics of the projection lens. In this instance it is found to be advantageous to provide for focusing of the reticle image within a range of approximately 80" to approximately 165". This range will accommodate the more readily experienced vehicle wheel bases. The projection lens 29 may be seen to be firmly fixed within a telescoping member 32 so that the distance from the reticle window to the projection lens may be varied to some degree to obtain a sharp reticle image at any point within the aforementioned range of wheel base measurements.

With reference now to FIGS. 1 and 2 an aluminum channel 33 is seen to extend internally along the lengths of the boom tube 14. The aluminum channel is attached at one end to a spreading collet 34 which, after assembly within the boom tube is expanded in a manner known to those familiar with such collets, so that it is fixed axially within the boom tube 14. The aluminum channel 33, when attached with screws to the collet as shown, is therefore also fixed axially within the tube. The opposite end of the aluminum channel is fixed by means of appropriate fasteners (not shown) to structure 35 mounted within the boom tube 14.

An opening 36 is formed in the bottom of the aluminum channel 33 as may best be seen in FIG. 2. An angled mirror mounting arm 37 is disposed beneath the channel 33 and the angled end extends upwardly through the hole 36. The other end of the mirror mounting arm is captured beneath the channel 33 by means of a plastic block 38 which is affixed to the bottom of the channel. The plastic block affords a bearing surface for the mirror mounting arm so that the mounting arm may move angularly in a plane parallel to the plane of FIG. 2 while preventing movement in a plane parallel to the plane of FIG. 1. This may be seen to prevent the mirror 26 from rotating about an axis perpendicular to the plane of FIG. 1 while allowing the mirror to rotate about an axis perpendicular to the plane of FIG. 2, i.e., an axis substantially perpendicular to the toe plane of the vehicle wheel.

The structure which allows rotation of the mirror 26 about an axis substantially perpendicular to the plane of FIG. 2 is shown in FIG. 2 as a flat steel spring 39 having offset ends, wherein one end is attached to the channel 33 and the other end is attached to a mirror adjusting block 41. The mirror adjustment block is firmly attached to the angled end of the mirror mounting arm 37 by means of screws as shown. A set screw 42 is threadedly engaged in the lower portion of the mirror adjustment block and is accessible from the exterior of the boom tube 14 through a pair of aligned holes 43 and 44 in the tube and the mirror mounting arm respectively.

With reference now to FIGS. 4 and 5 a description of the structure which provides for reflecting of the primary beam 27 along the length of the passage portion 22b will be presented. A mirror mounting block 46 is pivotally attached by means of a pivot pin 47 to the mirror adjustment block 41. A coiled compression spring 48 is positioned between the mirror adjustment block 41 and a receiving bore 49 within the lower portion of the mirror mounting block 46. It may be seen that the surface of the reflector 26 may be rotated about the axis of the pin 47 as shown in FIG. 5 by running the set screw 42 to advance or withdraw along the threads in the mirror adjustment block 41. This is a calibration setting which places the projected beam substantially along the reference axis 28 and therefore in a toe plane for the vehicle wheels.

The adjustment of the reflector 26 about an axis perpendicular to the plane of FIG. 1 is a one time operation generally made at the time of assembly. This adjustment takes up manufacturing tolerances and is accomplished by observing the projected reticle image on a calibrating fixture and turning the set screw 42 until the image falls at the proper height.

With reference now to FIG. 3 the structure provided for accomplishing angular movement of the projected beam in a toe plane will be described. An adjustment knob 51 is attached to a shaft 52 which is mounted for rotation in a plate 53 attached to the framework 21. A gear 54 is fixed to the shaft on one side of the mounting plate and a cam 56 formed substantially as a spiral ramp is attached to the shaft on the other side of the plate 53. A cam follower 57 is fixed to the mirror mounting arm 37 in a position to bear against the surface of the cam 56 as best seen in FIG. 3. The flat steel spring 39 is configured to force the cam follower against the cam surface for all positions of the cam surface. It may be seen that when the knob 51 is rotated, thereby rotating the cam 56, the cam follower 57 and therefore the mirror mounting arm 37 are moved laterally as seen in FIG. 3. This motion of the mirror mounting arm causes the reflector 26 to rotate about an axis which is substantially parallel to the plane of FIG. 3. In this fashion, the primary beam 27 impinging upon the surface of the reflector 26 and reflected down the length of the passage portion 22b may be seen to be adjustable through an angular excursion by the knob 51. The projected beam (and therefore the image of the reticle 31) will thereby be projected at an angle in a toe plane relative to the reference direction 28.

A rotary potentiometer 58 is mounted on the plate 53 having a shaft 59 extending therefrom to which is fixed a potentiometer gear 61. The potentiometer gear 61 is meshed with the gear 54 on the shaft which turns the cam 56. The gears 54 and 61 have a one-to-one ratio as shown, but different ratios may be provided for purposes of improving resolution of the output signal from the rotary potentiometer or for other purposes. As a consequence, the potentiometer output may be set at zero when the cam 56 is set to cause the reflector 26 to direct the light beam along the reference direction 28 and angular movement imparted to the reflector 26 as hereinbefore described will thereby give rise to an output from the rotary potentiometer having a predetermined scale factor dependent upon the excitation voltage of the potentiometer. In this fashion a signal indicative of the angular variation of the beam direction from the reference direction 28 is provided by the potentiometer.

Backlash in the gears 54 and 61 is eliminated in a preferred embodiment by providing a spiral spring which urges the potentiometer shaft 59 in one direction. The spring is configured so that full throw of the cam adjustment knob may be obtained without completely winding the spring. Alternate schemes for eliminating backlash between the gears are available and are deemed to be equivalent for the purposes of this disclosure. The cam is designed so as to provide approximately plus and minus 3½ inches which is about 800-880 millimeters of projected reticle image lateral movement at a 300 centimeter distance.

By way of example an aimable beam projector has been fabricated wherein the condensing lens 24 has an approximate focal length of 40 millimeters and is located about 44 millimeters from the filament of the lamp 16. The distance from the condensing lens along the passage portion 22a is approximately 228 millimeters and the distance from the reflecting member 26 to the projection lens 29 is approximately 260 millimeters (for a total of 488 millimeters). A projection lens 29 may be used having a 400 millimeter focal length mounted in the telescoping member 32. The reticle window 31 is mounted along the passages 22b and 22a a distance which is close to the focal length of the projection lens so that the image of the reticle window may be readily focused at distances of 200 to 400 centimeters, the usual wheel base range for a majority of passenger cars. It should also be realized that the reflector 26 may be either a first or second surface mirror or a prism depending upon the characteristics and angular movement of the reflected beam along the passage 22b which are desired. In the foregoing described embodiment an angle of approximately plus and minus 5° beam swing about the reference axis 28 in a toe plane is obtained.

The angular excursion of the projected beam in a toe plane is indicated by the signal from the rotary potentiometer 58 and is set by observation of the reticle image on a target set at the wheels on the other end of the vehicle chassis as described in copending U.S. patent application Ser. No. 261,445 mentioned hereinbefore.

Although the best mode contemplated for carrying out the present invention has been herein shown and described, it will be apparent that modification and variation may be made without departing from what is regarded to be the subject matter of the invention.

What is claimed is:

1. An aimable light projection system for measurement of vehicle wheel position in a toe plane wherein a beam of light is directed from an alignment head mounted on one wheel of a vehicle toward a target mounted on another wheel of the vehicle, comprising
   a framework,
   a passage having first and second angularly disposed lengths extending through said framework and having a reference axis therethrough,
   a light source mounted at one end of said first passage length providing a light beam therealong,
   a reticle mounted in said passage,
   a projection lens mounted near the other end of said second passage length so that an image of said reticle is focussed at the target,
   a condensing lens in said passage operating to focus an image of said light source substantially at said projection lens,
   a reflector disposed substantially at the intersection of said first and second passage lengths operating to receive and reflect said light beam along said second length,
   means for pivotally mounting said reflector at the interestion of said passage lengths for movement about an axis substantially perpendicular to the toe plane,
   a cam positioned to bear against said means for pivotally mounting whereby cam movement induces said reflector pivotal movement,
   manually accessible means for moving said cam,
   and position sensing means coupled to said manually accessible means, whereby a signal indicative of the angular position of said light beam and the displacement of said recticle image relative to said passage reference axis is provided.

2. A system as in claim 1 wherein said projection lens comprises
   a telescoping tube section within said other end of said passage and said projection lens fixed therein, said tube section being axially adjustable over a predetermined distance within said passage, whereby a sharp reticle image is provided for a predetermined range of target distances from the alignment head.

3. An aimable projector adapted to be installed in an alignment head adapted to be attached to a vehicle wheel for use in an alignment system for wheels supporting the vehicle chassis, comprising
   a framework attached to the alignment head,
   a passage through said framework having first and second angularly disposed lengths and a passage reference axis therealong,
   a light source disposed at one end of said passage providing a light beam therealong, a first lens disposed adjacent to said light source operating to focus an image thereof at the other end of said passage, a reticle mounted in said passage, a second lens mounted at the other end of said passage operating to focus an image of said reticle at a predetermined distance from the alignment head, a reflector disposed at the intersection of said first and second passage lengths, means for mounting said reflector for pivotal movement about an axis substantially perpendicular to the toe plane of the vehicle wheel, a cam disposed to bear against said means for mounting so that said reflector pivotal movement is induced when said cam is moved, manually accessible means for moving said cam, and a signal generator coupled to said manually accessible means, whereby a signal is provided which is indicative of the angular position of said light beam and the displacement of said reticle image relative to said passage reference axis.

4. A projector as in claim 3 wherein said second lens comprises a telescoping tube section positioned within the other end of said passage, and said second lens fixed therein, whereby a sharp reticle image may be had for a range of distances from the alignment head.

* * * * *